United States Patent [19]

Smith, Jr. et al.

[11] 3,905,233
[45] Sept. 16, 1975

[54] PACKAGE PENETRATION INDICATING APPARATUS

[75] Inventors: Lawrence W. Smith, Jr., Natick; Norman D. Roberts, Framingham, both of Mass.

[73] Assignee: The United States of America as represented by the Secretary of the Army, Washington, D.C.

[22] Filed: Mar. 26, 1974

[21] Appl. No.: 454,898

[52] U.S. Cl. ................. 73/432 R; 73/493; 73/52; 200/83; 340/240
[51] Int. Cl.² .................. G01M 3/34; H01H 35/24
[58] Field of Search........ 73/49.2, 49.3, 102, 432 R, 73/52, 170 R; 53/9; 116/114 C, DIG. 8; 200/61.08, 83 B, 83 N, 239, 279; 340/242, 253 B, 240

[56] References Cited
UNITED STATES PATENTS

| | | | |
|---|---|---|---|
| 2,040,919 | 5/1936 | Caldwell | 200/83 B X |
| 2,798,130 | 7/1957 | Cox | 200/83 |
| 2,919,320 | 12/1959 | Edwards, Jr. et al. | 200/83 N |
| 2,993,368 | 7/1961 | Schlein | 73/102 |
| 3,336,584 | 8/1967 | Kaiser | 340/242 |
| 3,735,376 | 5/1973 | Kermer et al. | 340/242 |
| 3,744,210 | 7/1973 | O'Lenick et al. | 73/49.3 X |
| 3,789,338 | 1/1974 | Szeverenyi et al. | 340/240 X |
| 3,796,843 | 3/1974 | Durkee et al. | 200/279 X |

*Primary Examiner*—Richard C. Queisser
*Assistant Examiner*—John S. Appleman
*Attorney, Agent, or Firm*—Nathan Edelberg; Robert P. Gibson; Charles C. Rainey

[57] ABSTRACT

An apparatus for indicating when an evacuated flexible package is penetrated by insects or other agents is comprised of a switch that is closed by atmospheric pressure on an evacuated flexible package and opens automatically when the flexible package is penetrated thus causing loss of vacuum in the flexible package. The switch is part of an electrical circuit including a source of electrical power and a device for indicating when power is flowing in the circuit and when it ceases flowing. The time of interruption of flow of electrical power in the circuit is taken as the time of penetration of the package.

10 Claims, 3 Drawing Figures

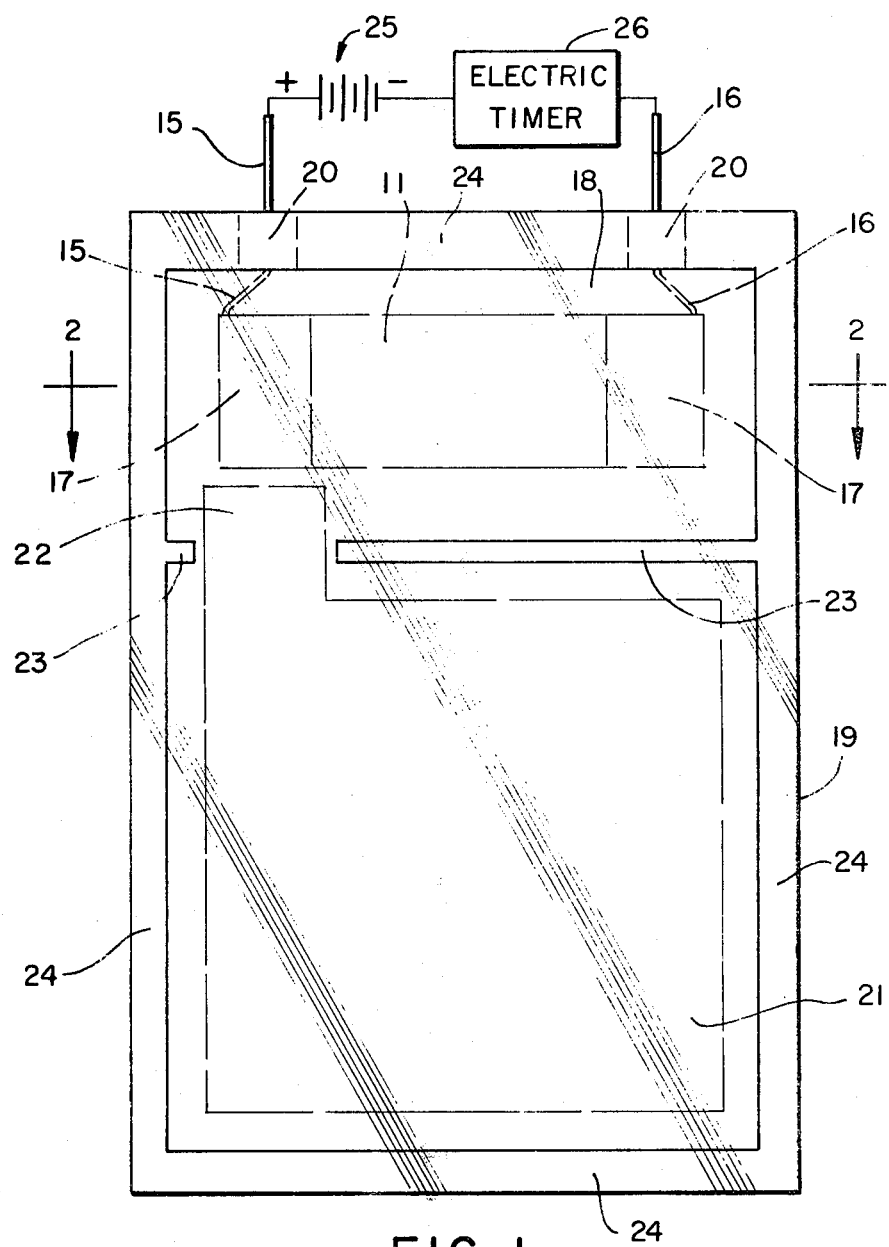
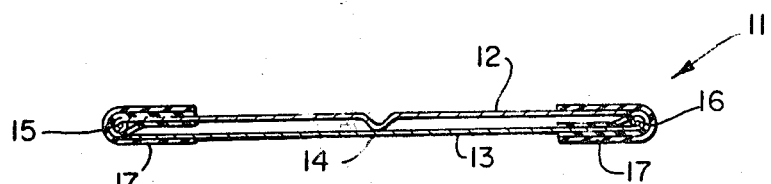
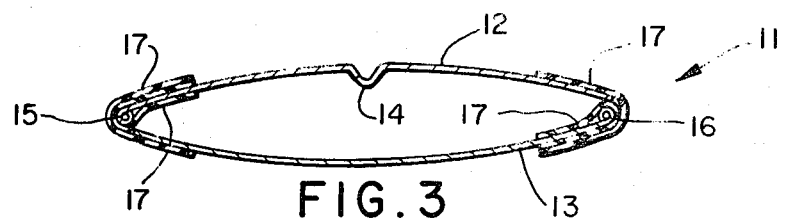

PACKAGE PENETRATION INDICATING APPARATUS

The invention described herein may be manufactured, used, and licensed by or for the Government for governmental purposes without the payment to us of any royalty thereon.

BACKGROUND OF THE INVENTION

This invention relates to an apparatus for determining when a gas-tight, flexible package from which substantially all of the gases have been evacuated is penetrated, for example by insects.

In the packaging of foods, especially for long-term storage, and particularly for storage in areas where certain insects live which are known to thrive on certain types of food, it is most important to develop packaging materials which will resist penetration by such insects. The Armed Forces are changing their procedures for packaging foods from the use of metallic cans to flexible packages as this is indicated to be desirable. Flexible packages of foods have advantages, such as lower weight and greater adaptability of such packages for being carried on the person, as well as being more economical than cans for packaging foods. However, they do have the disadvantage of being more easily penetrated by insects than cans. In many cases, when a food package is penetrated, no matter what the cause of the penetration may be, spoilage of the food may soon occur; and it goes without saying that if an insect is discovered in a food product, the potential consumer of the food product may lose all interest in the food and will discard the contaminated product in most cases. An important project in the food packaging field has become that of finding packaging materials for producing flexible packages of foods which are highly resistant to penetration by various insects which attack foods.

It is, therefore, an object of the invention to provide an apparatus and method which will be effective in determining how well a flexible packaging material resists penetration, particularly by insects of certain types.

Another object of the invention is to provide an apparatus to determine when an evacuated flexible package is penetrated and the partial vacuum therein is destroyed.

Other objects and advantages of the invention will be apparent from the following description of one embodiment of the invention, and the novel features will be particularly pointed out hereinafter in connection with the appended claims.

SUMMARY

The objects of the invention are accomplished by providing an apparatus comprising a switch, which is enclosed within a flexible package, and which completes an electrical circuit when the flexible package is evacuated. The electrical circuit includes a source of electrical power and a device for indicating when power is flowing through the circuit and for signalling when the power ceases to flow therethrough. Any penetration of the flexible package interrupts the electrical circuit and is suitably recorded.

BRIEF DESCRIPTION OF THE DRAWING

FIG. 1 is a plan view of an apparatus of the invention comprising a gas-tight, vacuum sealed flexible package containing a switch means in accordance with the invention, a battery source of electrical power, an electrical timer device, the material of which the package is made being a transparent resin film for convenience in visually observing the contents of the flexible package.

FIG. 2 is a cross-sectional view of the switch means of FIG. 1, taken through a plane represented by the line 2—2 of FIG. 1.

FIG. 3 is a cross-section of the switch means similar to that of FIG. 2 but with the switch converted to the open position as it would be after penetration of the package of FIG. 1 had occurred and the partial vacuum in the package had been destroyed.

DETAILED DESCRIPTION OF THE INVENTION

In the illustrated embodiment, the heart of the invention is a switch 11 which comprises a pair of resilient or spring-like, non-planar sheets of metal 12 and 13, preferably made of spring steel, both of which conduct electricity. As installed in the package before evacuation thereof, metal sheets 12 and 13 are bowed and placed in juxtaposition to each other so that the concave face of each metal sheet is opposite the concave face of the other metal sheet, as shown in FIG. 3. Metal sheet 12 is provided with a raised portion of metal 14 on its concave face which may be formed by stamping a dimple in metal sheet 12 or by other suitable means. Metal sheet 12 is crimped at one end thereof around an electrical lead 15 and metal sheet 13 is crimped at one end thereof around an electrical lead 16, the metal sheets 12 and 13 being arranged so that electrical lead 15 is spaced substantially the length of the switch from electrical lead 16. Metal sheets 12 and 13 are insulated from each other at both ends of the switch by means of insulation 17 which may be in the form of insulating tape wrapped about the ends of the metal sheets or an insulating coating applied to the surfaces of the metal sheets. Care is taken to insure that electrical lead 15 does not come into contact with metal sheet 13 and that electrical lead 16 does not come into contact with metal sheet 12.

In the use of the invention, the switch 11 is sandwiched between two sheets of film 18 near one end of what becomes a flexible package 19 in due course. The electrical leads 15 and 16 are permitted to extend beyond the ends of the sheets of film and are cemented between the two sheets of film with cement 20. A porous paper bag 21 containing food which is attractive to certain insects is sandwiched between the two sheets of film 18 at the other end of the flexible package, the porous paper bag 21 being provided with an extension 22, the purpose of which will be described below. A heat seal 23 is made across the package above the major portion of porous paper bag 21 and crossing the extension 22, sealing the two sheets of film 18 together across the width of the flexible package except for the portions of the film overlying and underlying the extension 22. Thus the porous paper extension 22 permits the maintenance of freedom of flow of gases between the portion of the package containing the switch and the portion containing the porous paper bag of food. The peripheral edges of the two sheets of film 18, which are either inherently heat-sealable to each other or have a heat-sealable coating or lamina on the mutually contacting faces thereof, are heat sealed except along one side or a short portion thereof through which the package can be evacuated. The package is then evacuated to the internal pressure desired and vacuum sealed by means of heat seals 24 around the periphery of the package, which are completed while the package is held under vacuum. When the internal pressure within the package is reduced to a level such that the pressure of the atmosphere pressing upon the film 18 and in turn upon the convex surfaces of the metal sheets of the switch is able to overcome the resistance of the bowed, spring-like metal sheets 12 and 13, the latter are forced together until the raised portion of metal 14 on the concave or inner surface of metal sheet 12 makes contact with the concave or inner surface of metal sheet 13, thus closing the switch. The switch remains closed with metal sheet members 12 and 13 in a tensioned state as long as a partial vacuum remains inside of the flexible package while the package is exposed to the atmosphere. When a test is to be run to determine the resistance of the material of which the flexible package is made to penetration by a selected type of insect, the gas-tight, vacuum sealed flexible package is placed in an area containing a standard population of the insects which are attracted by the food inclosed in the porous paper bag 21. A battery 25 or other electrical power source and a signal means, which is preferably an electrical timer 26, are connected to each other and to electrical leads 15 and 16 to produce an electrically energized circuit including switch 11 and the timer. The timer starts when the circuit is completed and continues running until the flexible package is penetrated by an insect in its efforts to get to the food enclosed within the flexible package. As soon as penetration of the flexible package occurs, air flows back into the package, equalizing the pressure in the package with that outside of the package, thus permitting the two tensioned metal sheets of the switch to spring apart, converting from a closed position to an open position, thus interrupting the electrical circuit and causing the electrical timer to stop.

The penetration of the flexible package is, of course, not limited to insect penetration; hence, under suitable experimental conditions the apparatus of the invention is useful for indicating or determining the resistance of any type of flexible packaging material to any particular type of penetration, whether by insect invasion, by various types of physical damage, or by chemical attack.

Various other means may be employed for indicating when a flexible package has been penetrated. For example, an electric light which goes out at the time of penetration or a solenoid driven signal device may be employed instead of an electrical timer, if desired.

The flexible packaging material of which the flexible package is constructed need not be transparent, though transparency thereof may be helpful in ascertaining that the switch is open when the electrical timer or other signal device indicates that penetration of the flexible package has occurred.

It is important that the flexible packaging material of which the flexible package is made be substantially impervious to air; otherwise, spurious results would be obtained with the device of the invention since air migrating into the package through pores in the flexible packaging material would cause premature loss of vacuum and interruption in the electrical circuit prior to actual penetration of the flexible packaging material by an insect or other penetrating agent.

It will be apparent that we have provided a very effective means for indicating when a flexible package of food or other materials which require protection from the atmosphere, from insects or from other contaminants, or protection against physical or chemical damage, has been penetrated by an insect or other agent causing penetration of flexible packaging materials. This device will assist greatly in determining the resistance of flexible packaging material to penetration and in the development of new types of flexible packaging materials of greater insect resistance, or resistance to physical or chemical damage. It will, of course, be useful for any other purpose where one needs to known when an evacuated flexible package loses its vacuum.

It will be understood that various changes in the details, materials and arrangements of parts which have been herein described and illustrated in order to explain the nature of the invention, may be made by those skilled in the art within the principle and scope of the invention.

We claim:

1. Apparatus for use in determining the resistance of a flexible packaging material to penetration, which comprises in combination:
   a. a gas-tight, evacuated and hermetically sealed flexible package,
   b. switch means located within said package which responds to the evacuation of said package by closing, is maintained in a closed position within said package as long as said package remains evacuated, and responds to a loss of vacuum within said package by converting to an open position,
   c. electrically energized circuit means in electrical communication with said switch means and extending to the exterior of said package, and
   d. signal means in electrical communication with said circuit means for detecting any interruption in the electrical circuit, whereby a loss of vacuum in said package causes said switch to open breaking said electrical circuit which event is detected by the signal means.

2. Apparatus according to claim 1, wherein an electrical power source for energizing said electrically energized circuit is located outside of said package.

3. Apparatus according to claim 2, wherein said electrical power source is a battery.

4. Apparatus according to claim 2, wherein said switch means comprises opposed tensioned members held in a closed or electrically conducting relationship by the atmospheric pressure on said gas-tight, evacuated and hermetically sealed package and which respond to a loss of vacuum within said package by yielding to an open or electrically non-conductive relationship.

5. Apparatus according to claim 4, wherein said opposed tensioned members comprise a pair of resilient, non-planar sheets of metal each having a concave face and a convex face, said sheets of metal being disposed with their concave faces opposed to each other, each end of each sheet of metal being adjacent to one end of the other sheet of metal, said ends being electrically insulated from each other, one of said sheets of metal having a raised portion of metal on its concave face, each of said sheets of metal having an electrical lead connected thereto and leading to said electrical power source and said signal means.

6. Apparatus according to claim 5, wherein said sheets of metal are sheets of spring steel.

7. Apparatus according to claim 5, wherein said signal means is an electrical timer.

8. Method of determining the resistance of a flexible packaging material to penetration comprising the steps of:
   a. exposing an evacuated and hermetically sealed flexible package comprised of said flexible packaging material to a penetration producing means,
   b. detecting a loss of vacuum in said package by the action of a mechanical means for indicating a loss of vacuum inclosed within said package, and
   c. determining the period of time between the exposure of said package to said penetration producing means and the loss of vacuum within said package, the resistance of said flexible packaging material to penetration being proportional to said time period.

9. Method according to claim 8, wherein prior to said step of exposing said evacuated and hermetically sealed flexible package to said penetration producing means, a food product which is attractive to insects is inclosed within said flexible package and said flexible package is evacuated and hermetically sealed, and in said step of exposing said evacuated and hermetically sealed flexible package to a penetration producing means said package is exposed to insects which are attracted by said food product.

10. Method according to claim 9, wherein in said step of determining said period of time said loss of vacuum within said package results in interruption in an electrically energized circuit.

\* \* \* \* \*